United States Patent
Rahoui et al.

(10) Patent No.: US 10,266,782 B2
(45) Date of Patent: Apr. 23, 2019

(54) PROCESS FOR MANUFACTURING A PART PROVIDED WITH A LUBRICATING SURFACE COATING, PART PROVIDED WITH SUCH A COATING AND TURBOMACHINE

(71) Applicants: LIEBHERR-AEROSPACE TOULOUSE SAS, Toulouse (FR); CENTRE NATIONAL DE LA RECHERCHE SCIENTIFIQUE (C.N.R.S.), Paris (FR); UNIVERSITE PAUL SABATIER TOULOUSE III, Toulouse (FR)

(72) Inventors: Souphiane Rahoui, Toulouse (FR); Jean-Pierre Bonino, Pechabou (FR); Viviane Turq-Perrussel, Toulouse (FR); Jerome Rocchi, Roqueseriere (FR)

(73) Assignees: LIEBHERR-AEROSPACE TOULOUSE SAS, Toulouse (FR); CENTRE NATIONAL DE LA RECHERCHE SCIENTIFIQUE (C.N.R.S), Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 673 days.

(21) Appl. No.: 14/787,087

(22) PCT Filed: Apr. 23, 2014

(86) PCT No.: PCT/FR2014/050986
§ 371 (c)(1),
(2) Date: Oct. 26, 2015

(87) PCT Pub. No.: WO2014/174215
PCT Pub. Date: Oct. 30, 2014

(65) Prior Publication Data
US 2016/0083666 A1 Mar. 24, 2016

(30) Foreign Application Priority Data

Apr. 26, 2013 (FR) ...................................... 13 53885

(51) Int. Cl.
*C10M 103/02* (2006.01)
*F16C 33/16* (2006.01)
(Continued)

(52) U.S. Cl.
CPC ......... *C10M 103/02* (2013.01); *B05D 3/0254* (2013.01); *B05D 5/08* (2013.01);
(Continued)

(58) Field of Classification Search
None
See application file for complete search history.

(56) References Cited

U.S. PATENT DOCUMENTS

| 4,488,977 A | * | 12/1984 | Patrichi | F16C 33/04 508/103 |
| 2011/0178243 A1 | * | 7/2011 | McMichael | C08J 3/2053 525/54.1 |

(Continued)

FOREIGN PATENT DOCUMENTS

| EP | 1 752 227 A1 | 2/2007 |
| WO | 2009/141830 A1 | 11/2009 |

OTHER PUBLICATIONS

International Search Report, dated Jul. 30, 2014, from corresponding PCT application.

*Primary Examiner* — Jeffrey D Washville
(74) *Attorney, Agent, or Firm* — Young & Thompson

(57) ABSTRACT

A process for manufacturing a part provided with a lubricating surface coating (10), in which: a composition is prepared that includes at least one precursor having at least one organic group, the composition is deposited on the part, a heat treatment is carried out, wherein the heat treatment of (Continued)

Figure 1:
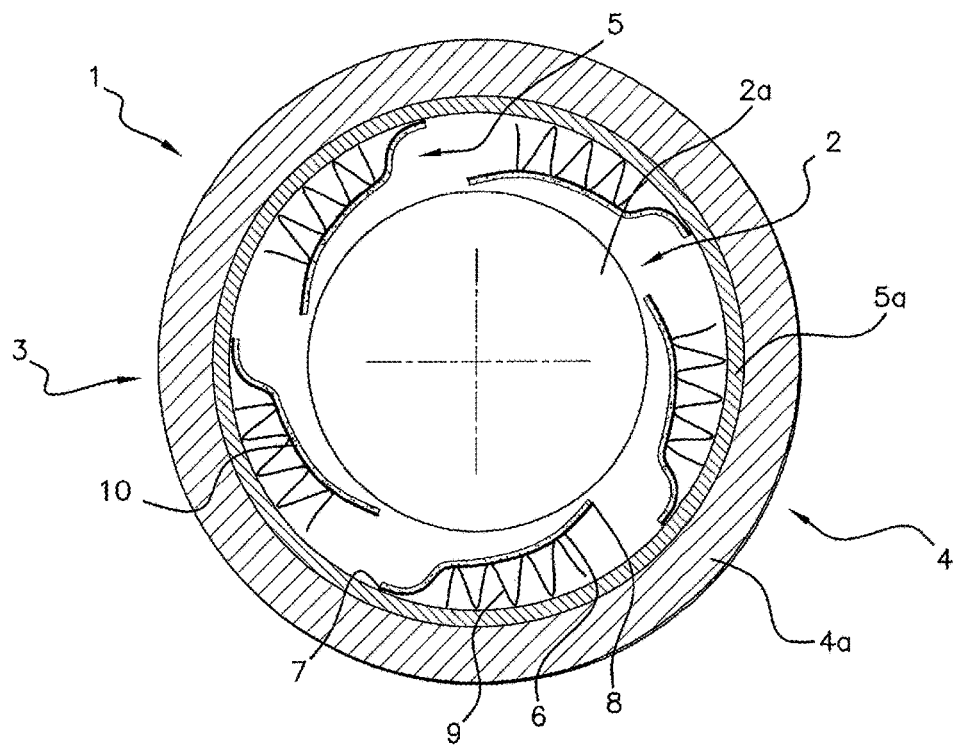

the coating is carried out at a temperature above 220° C., so as to form a lubricating surface coating (10) formed of an at least partially inorganic solid network incorporating solid carbon in at least one lubricating allotropic form in the dispersed state and trapped within the solid network. A part, such as a foil of a foil bearing (1) obtained by the process, a turbomachine, such as a turbomachine for a fuel cell, including such a part, and an aircraft cabin air-conditioning system including at least one such turbomachine are also described.

14 Claims, 5 Drawing Sheets

(51) Int. Cl.
*B05D 5/08* (2006.01)
*B05D 3/02* (2006.01)
*C23C 18/12* (2006.01)
*B05D 7/14* (2006.01)
*C23C 18/04* (2006.01)

(52) U.S. Cl.
CPC .............. *B05D 7/14* (2013.01); *C23C 18/122* (2013.01); *C23C 18/1216* (2013.01); *C23C 18/1241* (2013.01); *C23C 18/1254* (2013.01); *C23C 18/1275* (2013.01); *C23C 18/1279* (2013.01); *F16C 33/16* (2013.01); *B05D 2601/20* (2013.01); *C10M 2201/0413* (2013.01); *C23C 18/04* (2013.01); *Y02T 50/6765* (2018.05)

(56) References Cited

U.S. PATENT DOCUMENTS

2012/0141290 A1* 6/2012 Oboodi .................... F16C 33/12
 416/241 R
2014/0024563 A1* 1/2014 Heidecker ........... F04C 15/0003
 508/106

* cited by examiner

PROCESS FOR MANUFACTURING A PART PROVIDED WITH A LUBRICATING SURFACE COATING, PART PROVIDED WITH SUCH A COATING AND TURBOMACHINE

The invention relates to a process for manufacturing a part provided with a lubricating surface coating. The invention relates also to a part, such as a turbomachine bearing foil, provided with a lubricating surface coating obtainable by such a process.

The invention relates further to a turbomachine comprising such a part, and to an aircraft cabin air conditioning system comprising such a turbomachine.

Parts such as the foils of a foil bearing or of an axial thrust bearing allow one part to rotate relative to another on a film of fluid, in particular a gas such as air. They are used, for example, in the turbines and compressors of aircraft air conditioning systems or in turbocompressors for fuel cells, and they are subjected to considerable dynamic friction forces, in particular during stopping and start-up phases.

In order to reduce the wear of such parts, it is known to use a coating based on fluorocarbon compounds such as polytetrafluoroethylene (PTFE). However, such a coating has many implementation disadvantages associated with its toxicity to humans and the environment. Furthermore, such a coating has a limited maximum use temperature (200° C. to 250° C.).

US 2012/0141290 describes a method for applying a lubricating coating to a substrate which involves using lubricating particles which are themselves coated with a protective film. The binder of the coating incorporating the lubricating particles is formed of a eutectic mixture based, for example, on copper sulfide and silver. Such a method has many implementation constraints and comprises successive steps, and it does not allow satisfactory lubricating and wear resistance properties to be obtained.

Accordingly, the invention aims to propose a process for manufacturing a part provided with a lubricating surface coating and a part provided with such a lubricating surface coating which allow those disadvantages to be remedied.

Accordingly, the invention aims to propose a process for manufacturing a part provided with a lubricating surface coating which can be carried out simply and quickly.

In particular, the invention aims to propose a process for manufacturing a part provided with a lubricating surface coating which is compatible with safety and environmental protection constraints, and in particular which is not liable to endanger the health of the operators who carry it out.

The invention aims also to propose a process which is simple to carry out and which requires only a small number of operations.

The invention aims also to propose a process with which there can be manufactured a part provided with a lubricating surface coating whose properties remain stable over time for a prolonged period, in particular for a period which is sufficiently long and which can be certified in order to allow such a part to be used on board an aircraft, a space system or a land or water vehicle. The invention aims in particular to propose a manufacturing process without the addition of solid lubricating fillers which may later be released from the coating.

The invention aims to propose a process which allows a part provided with a lubricating surface coating to be manufactured from a small number of starting products.

The invention aims also to propose a part provided with a lubricating surface coating which is capable of being integrated into a turbomachine, especially which has excellent properties of lubrication and resistance to wear at high speed—in particular at more than 100 m/s and up to more than 2000 m/s (for example 20,000 revolutions/minute and up to more than 60,000 revolutions/minute for an aircraft air conditioning system turbomachine bearing)—and at high temperature—in particular at more than 200° C. and up to more than 500° C.

To that end, the invention relates to a process for manufacturing a part provided with a lubricating surface coating, wherein:
  a composition comprising at least one precursor of said coating having at least one organic group is prepared,
  said composition is deposited on at least a portion of a surface of said part, said portion of a surface of the part being formed of at least one metallic material,
  after said composition has been deposited on the surface of said part, at least one heat treatment is carried out at a temperature greater than 220° C. so as to form a lubricating surface coating,
wherein said composition comprises at least one precursor of said coating chosen from the group formed of the alkoxides of the following general formula (I):

$$X(O-R_1)_{n'-a}(R_2)_a \qquad (I)$$

wherein:
  X is chosen from silicon (Si) and the metallic elements,
  $R_1$ is chosen from the hydrocarbyl groups,
  n' is a natural integer representing the valence of the element X,
  a is a natural integer of the interval [1; n'[,
  $R_2$ is chosen from the organic groups bonded to X by a carbon atom, so as to form, at the end of said heat treatment, a lubricating surface coating formed of an at least partially inorganic solid network incorporating solid carbon in at least one lubricating allotropic form in a dispersed state and trapped within said solid network.

Advantageously and according to the invention, at least one organic group of at least one precursor of said coating is chosen from the hydrocarbyl groups. Furthermore, advantageously and according to the invention, the heat treatment is carried out at a temperature below the temperature of total decomposition of the lubricating allotropic forms of the solid carbon, especially so as to form within said solid network at least one solid lubricating compound of carbon chosen from the group formed of graphene, graphite, amorphous carbon and mixtures thereof.

Throughout the text, "graphene" is understood as meaning an allotropic form of carbon formed of carbon atoms bonded to one another by $sp^2$ type C—C bonds and having at least one layer formed of a monolayer of carbon atoms bonded to one another in a flat hexagonal lattice. Graphene can optionally be in a partially oxidized form.

Throughout the text, "graphite" is understood as meaning an allotropic form of carbon constituted by a stack of at least 50 layers of graphene.

Throughout the text, "amorphous carbon" is understood as meaning any allotropic form of carbon comprising both $sp^a$ type C—C bonds and $sp^2$ type C—C bonds.

The inventors have found, wholly surprisingly, that by subjecting a surface coating prepared from a composition comprising at least one precursor having at least one organic group to heat treatment at a temperature greater than 220° C. it is possible to obtain a lubricating surface coating formed of an at least partially inorganic solid network incorporating, dispersed and trapped within the solid network, solid carbon in at least one lubricating allotropic form, namely especially graphene and/or graphite and/or amorphous carbon.

In particular, the inventors have found that the properties of lubrication and resistance to wear at high speed of said coating are such that it is possible to use a part manufactured by a process according to the invention at more than 60,000 revolutions/minute and up to 120,000 revolutions/minute for an aircraft air conditioning system turbomachine bearing.

There is therefore obtained an inorganic lubricating surface coating incorporating solid carbon in a lubricating allotropic form dispersed and trapped within its network without having to handle and add graphene, graphite and/or amorphous carbon, especially in powder form, to the composition comprising the precursor of said coating. A possible explanation for this phenomenon is that, during the heat treatment, the organic groups carried by said precursor are converted in situ, within the surface coating that is being formed, into at least one solid lubricating compound of carbon belonging to the group formed of graphene, graphite, amorphous carbon and mixtures thereof.

Accordingly, advantageously and according to the invention, said composition comprising at least one precursor of said coating can itself be free of lubricating agent, in particular of solid lubricating agent, and especially free of graphene, graphite, amorphous carbon or of molybdenum sulfide or particles of fluorocarbon compound(s). It is therefore free of any solid lubricating particle added to the solid network formed by heat activation of each precursor of the coating. It is likewise free of any molecule which might be grafted onto graphene and/or graphite and/or amorphous carbon in order to increase the compatibility thereof with the precursor(s).

In particular, a process according to the invention makes it possible to obtain a coating in which the solid carbon in at least one lubricating allotropic form is present in the form of homogeneously dispersed particles. More particularly, the particles of graphene and/or of graphite and/or of amorphous carbon are in the exfoliated state (individual particles and/or layers) and are not agglomerated in said coating.

Advantageously and according to the invention, the heat treatment of the coating is carried out at a temperature greater than 220° C. and at a temperature below the temperature of decomposition by total oxidation of each organic group of the precursor to gaseous products ($CO_2$, . . . ). In particular, advantageously and according to the invention, said heat treatment of said coating is carried out under conditions adapted to prevent, or at least limit, the decomposition of each organic group, especially to carbon dioxide.

An organic group of the precursor can be any organic group comprising at least one carbon atom, so as to provide a carbon source in order to make it possible to obtain, dispersed and trapped within said solid network, at least one solid lubricating compound of carbon, especially graphene and/or graphite and/or amorphous carbon. Advantageously and according to the invention, at least one organic group of a precursor of said coating is chosen from the hydrocarbyl groups. Advantageously and according to the invention, at least one organic group of a precursor of said coating is chosen from the linear alkyls, the branched alkyls and/or the cyclic alkyls. Such hydrocarbyl groups can be alkyl groups, aryl groups, vinyl groups and can have at least one functional group chosen from an ester, an epoxide functional group, an aldehyde, a ketone, an amine, an amide, a carboxylic acid or a group comprising a halogen and, where appropriate, their conjugated salts.

Advantageously and according to the invention, at least one organic group of a precursor of said coating is chosen from organic groups having from 1 to 25 carbon atoms, especially from organic groups having from 3 to 15 carbon atoms.

Advantageously and according to the invention, the precursor of said coating has at least one organic group that is not hydrolyzable in said composition. Furthermore, advantageously and according to the invention, said organic group that is not hydrolyzable in said composition is chosen from hydrocarbyl groups bonded to said precursor by a carbon atom.

Advantageously and according to the invention, at least one precursor of said coating is chosen from the group formed of alkoxides having at least one group that is hydrolyzable in said precursor composition and at least one organic group that is not hydrolyzable in said precursor composition. Such an alkoxide is capable of forming a hybrid (organic-inorganic) matrix by hydrolysis/condensation formed of inorganic atom chains (for example of the type: —Si—O—Si—) and of organic hydrocarbon chains.

Accordingly, advantageously and according to the invention, at least one precursor of said coating is chosen from the group formed of the alkoxides of the following general formula (I):

$$X(O-R_1)_{n'-a}(R_2)_a \qquad (I)$$

wherein:
X is chosen from silicon (Si) and the metallic elements,
$R_1$ is chosen from the hydrocarbyl groups,
n' is a natural integer representing the valence of the element X,
a is a natural integer of the interval [1; n' [,
$R_2$ is chosen from the organic groups bonded to X by a carbon atom.

X can be chosen from the chemical elements of blocks d and p of the periodic table of the elements (Mendeleev's table), such as silicon (Si), aluminium (Al), titanium (Ti), zirconium (Zr) and vanadium (V) or alternatively tungsten (W), tantalum (Ta), niobium (Nb) and iron (Fe).

In particular, advantageously and according to the invention, said alkoxide has at least one group that is not hydrolyzable. Accordingly, advantageously and according to the invention, said organic group $R_2$ is chosen from groups bonded to X by a carbon atom and having from 1 to 12 carbon atoms.

The precursor composition can accordingly comprise one or more alkoxysilane(s) and/or one or more metal alkoxide(s). Advantageously and according to the invention, said composition comprises at least one alkoxysilane. In a particularly advantageous variant of a process according to the invention, said composition comprises at least one alkoxysilane and at least one metal alkoxide.

In particular, advantageously and according to the invention, said composition comprises at least one precursor chosen from the group formed of the alkoxysilanes of the following general formula (II):

$$Si(O-R_1)_{4-a}(R_2)_a \qquad (II)$$

wherein:
$R_1$ is chosen from the hydrocarbyl groups,
a is a natural integer of the interval [1; 3],
$R_2$ is chosen from the organic groups bonded to the silicon by a carbon atom.

Advantageously and according to the invention, at least one precursor is chosen from the group formed of the alkoxysilanes of the following general formula (II):

$$Si(O-R_1)_{4-a}(R_2)_a \qquad (II)$$

wherein:
R₁ is chosen from the hydrocarbyl groups,
a is a natural integer of the interval [1; 3],
R₂ is chosen from the organic groups bonded to the silicon by a carbon atom.

Advantageously, the group R₂ of each alkoxysilane is chosen from the group formed of 3,4-epoxycyclohexylethyl and glycidoxypropyl.

Advantageously, each alkoxysilane is chosen from the group formed of glycidoxypropyltrimethoxysilane (GPTMS), glycidoxypropylmethyl-dimethoxysilane (MDMS), glycidoxypropylmethyldiethoxysilane (MDES), glycidoxypropyltriethoxysilane (GPTES), methyltriethoxysilane (MTES), dimethyldiethoxysilane (DMDES), methacryloxypropyltrimethoxysilane (MAP), 3-(trimethoxysilyl) propylamine (APTMS), 2-(3,4-epoxycyclohexyl)ethyl-triethoxy-silane (ECHETES), 2-(3,4-epoxycyclohexyl) ethyl-trimethoxysilane (ECHETMS) and 5,6-epoxyhexyltriethoxysilane (EHTES).

The composition comprising at least one precursor of said coating can therefore comprise only one (or a plurality of) silicon alkoxide(s) (alkoxysilane). The composition comprising at least one precursor of said coating can also comprise at least one metal alkoxide (on its own or in combination with at least one alkoxysilane).

Advantageously and according to the invention, said composition comprises at least one precursor of said coating chosen from the group formed of the metal alkoxides of the following general formula (III):

$$M(O-R_3)_m \qquad (III)$$

wherein:
M is a metallic element chosen from aluminium, titanium, zirconium and vanadium,
R₃ is a hydrocarbyl group of the formula $[C_nH_{2n+1}]$, n being an integer greater than or equal to 1,
m is a natural integer representing the valence of the metallic element M.

Advantageously and according to the invention, the hydrocarbyl group R₃ of the formula $[C_nH_{2n+1}]$ is especially chosen from the group formed of a methyl, an ethyl, a propyl, a butyl, in particular a normal secondary butyl of the formula $[CH_3-CH_2-(CH_3)CH-]-$.

Advantageously and according to the invention, each metal alkoxide is chosen from the group formed of aluminium alkoxides—especially aluminium tri(sec-butoxide), aluminium tri(n-butoxide), aluminium tri(ethoxide), aluminium tri(ethoxyethoxyethoxide) and aluminium tri(isopropoxide), titanium alkoxides—especially titanium tetra(n-butoxide), titanium tetra(isobutoxide), titanium tetra (isopropoxide), titanium tetra(methoxide) and titanium tetra-(ethoxide)-, vanadium alkoxides—especially vanadium tri(isobutoxide) oxide and vanadium tri(isopropoxide) oxide-, and zirconium alkoxides—especially zirconium tetra (ethoxide), zirconium tetra(isopropoxide), zirconium tetra (n-propoxide), zirconium tetra(n-butoxide) and zirconium tetra(tert-butoxide).

Advantageously and according to the invention, the single aluminium alkoxide is chosen from the group formed of aluminium tri(s-butoxide), aluminium tri(n-butoxide), aluminium tri(ethoxide), aluminium tri(ethoxyethoxyethoxide) and aluminium tri(isopropoxide).

Advantageously and according to the invention, the molar ratio of the alkoxysilanes to the metal alkoxides in the composition is from 99/1 to 50/50. Advantageously and according to the invention, the molar ratio of the totality of the alkoxysilanes to the totality of the metal alkoxides in the composition is from 99/1 to 50/50.

Advantageously and according to the invention, the molar ratio of the alkoxysilanes and the metal alkoxides—especially aluminium alkoxide—in the composition is from 85/15 to 6/4 and especially from 8/2 to 64/36. Advantageously and according to the invention, the molar ratio of the totality of the alkoxysilanes to the totality of the metal oxides in the composition is from 85/15 to 64/36.

In addition, the composition comprising at least one precursor of said coating comprises at least one liquid solvent, in particular an aqueous-alcoholic solvent formed of water and at least one alcohol. There is advantageously used in particular an alcohol chosen from ethanol, 1-propanol and 2-propanol.

Accordingly, in a first step of a process according to the invention, a liquid composition comprising at least one precursor of said coating, in particular at least one alkoxysilane and/or at least one metal alkoxide, and at least one liquid solvent is prepared.

Then, in a second step of a process according to the invention, said liquid composition is deposited on said part by any deposition technique which permits the deposition of a quantity of liquid composition adapted to form said surface coating. A process according to the invention is thus a process of the sol-gel type allowing a coating to be formed which may be described as "hybrid".

Advantageously and according to the invention, said liquid composition is deposited on at least a portion of a surface of said part by a deposition technique chosen from dip coating, spray coating, spin coating and screen printing. In a particularly advantageous variant of a process according to the invention, said liquid composition is deposited by dip coating or by spray coating. Furthermore, for example in order to touch up a part, the liquid composition can likewise be deposited by means of a brush or a pad. Of course, one or more layer(s) of said composition can be deposited on each part to be manufactured.

After said composition has been deposited on the surface of the part, said heat treatment according to the invention is carried out, causing the composition to solidify and said coating to form in the solid state.

Said heat treatment is carried out under predetermined temperature conditions, for a predetermined period of time and in an atmosphere adapted to permit the formation of a lubricating surface coating formed of an at least partially inorganic solid network within which there is dispersed and imprisoned, in the natural state, lubricating solid carbon, especially graphene and/or graphite and/or amorphous carbon.

The duration and the temperature of said heat treatment are chosen especially according to the nature of each precursor and of the coating, the nature of the lubricating allotropic form(s) of carbon that is(are) desired, and the atmosphere within which the heat treatment is carried out. In particular, advantageously and according to the invention, said heat treatment is carried out for a duration of from 10 minutes to 72 hours, in particular from 30 minutes to 16 hours.

Furthermore, advantageously and according to the invention, said heat treatment can be carried out under a neutral, reducing or oxidizing atmosphere, for example in air. Advantageously and according to the invention, said heat treatment is carried out in a gaseous atmosphere comprising at least one gas chosen from oxygen, dinitrogen, carbon dioxide and mixtures thereof In a first variant embodiment of a process according to the invention, said heat treatment is carried out in an oxidizing atmosphere, for example in air, at a temperature of from 220° C. to 450° C., in particular from 250° C. to 400° C. In a second variant embodiment of a process according to the invention, said heat treatment is carried out in a non-oxidizing atmosphere at a temperature of from 300° C. to 800° C., in particular from 350° C. to 550° C. The gaseous atmosphere in which said heat treatment is carried out can also comprise a mixture of at least one neutral gas with at least one oxidizing gas, in all possible proportions.

The duration and the temperature of the heat treatment of a process according to the invention are in particular reduced as compared with the duration and the temperature of heat treatment that are generally necessary in the case of the manufacture of a part having a coating based on polytetrafluoroethylene.

In addition, advantageously and according to the invention, said heat treatment is carried out so as to form cracks in said coating.

The inventors have observed, wholly surprisingly, that such a coating has cracks which allow the compressive stresses which may be present within the coating to be reduced. The inventors have also observed that the presence of such cracks makes it possible to facilitate, where appropriate, the subsequent shaping of the prepared part. This is particularly advantageous in the case of the preparation of foil bearing foils which must be bent. Furthermore, the cracking which can take place during the heat treatment of a process according to the invention occurs without flaking (which would be detrimental to the manufactured part).

Accordingly, advantageously and according to the invention, after said heat treatment, said part is deformed by bending. In fact, in the variant embodiment in which the coating manufactured by a process according to the invention has cracks, said part (with its lubricating coating) can be shaped (folded, bent, curved, especially by rolling) without causing any deterioration of the coating or of the attachment thereof to the surface of the part, and allowing its lubricating properties to be maintained.

The invention extends to a part obtainable by a process according to the invention. Accordingly, it relates to a part provided with a lubricating surface coating, wherein said coating is formed of an at least partially inorganic solid network incorporating solid carbon in at least one lubricating allotropic form—especially at least one solid lubricating compound of carbon chosen from the group formed of graphene, graphite, amorphous carbon and mixtures thereof—in the dispersed state and trapped within said solid network.

The invention extends in particular to a part provided with a lubricating surface coating, wherein said coating is formed of an at least partially inorganic solid network incorporating graphene in the dispersed state and trapped within said solid network. Such particles of graphene make it possible to obtain a coating having excellent lubricating properties without significantly modifying the microstructure of said solid network.

Accordingly, said coating comprises particles of solid carbon (especially of graphene and/or graphite and/or amorphous carbon) which have not been obtained by adding particles of solid carbon (in powder form or in a liquid suspension). Advantageously and according to the invention, said particles of solid carbon are dispersed in said coating and are in individualized form (that is to say are not agglomerated with one another) in said coating. Furthermore, advantageously and according to the invention, said coating comprises particles of solid carbon having at least one dimension less than 400 nm and especially less than 100 nm. In particular, said particles of solid carbon have a mean size of from 10 nm to 500 nm within said coating.

Advantageously and according to the invention, said coating comprises particles of graphene having a mean size of from 10 nm to 50 nm.

Furthermore, advantageously and according to the invention, said coating comprises from 2 wt. % to 45 wt. %, especially from 5 wt. % to 40 wt. %, of particles of solid carbon—especially of graphene and/or graphite and/or amorphous carbon—based on the total weight of said coating. In particular, the proportion by mass of solid carbon—especially of graphene and/or graphite and/or amorphous carbon—in said coating is from 20% to 30%, for example 25%. The proportion can be measured by elemental microanalysis, for example by analysis of the total organic carbon (TOC). The proportion by mass of solid carbon in the coating can vary according to the conditions under which the heat treatment is carried out, but also according to the nature of the precursors and of the group $R_2$ in particular.

In particular, advantageously and according to the invention, said coating obtained after said heat treatment is free of organic groups and especially of polymeric material and is composed solely of a solid ceramic network (in particular formed of silica and/or alumina) incorporating graphene and optionally graphite or amorphous carbon.

The invention extends in particular to a part provided with a lubricating surface coating comprising:
a solid network formed from:
at least one precursor chosen from the group formed of the alkoxysilanes of the following general formula (II):

$$Si(O-R_1)_{4-a}(R_2)_a \qquad (II)$$

wherein:
$R_1$ is chosen from the hydrocarbyl groups,
a is a natural integer of the interval [1; 3],
$R_2$ is chosen from the hydrocarbyl groups that are not hydrolyzable in said composition,
at least one precursor chosen from the group formed of the metal alkoxides of the following general formula (III):

$$M(O-R_3)_m \qquad (III)$$

wherein:
M is a metallic element chosen from aluminium, titanium, zirconium and vanadium,
$R_3$ is a hydrocarbyl group of the formula $[C_nH_{2n+1}]$, n being an integer greater than or equal to 1,
m is a natural integer representing the valence of the metallic element M,
at least one solid lubricating carbon compound dispersed in said matrix, said solid lubricating carbon compound being chosen from the group formed of graphene, graphite and amorphous carbon.

Said part can be any part that is to be subjected to considerable friction. Said part can especially be a foil of a foil bearing, comprising a rotor, which is movable in rotation about a shaft, and a stator (fixed part), the stator comprising a first structure, named the support, which is adapted to support, facing the rotor, a second structure, named the lift device, said lift device comprising a plurality of evenly distributed foils which extend over a circular sector and are fixed by an edge, named the fixing edge, to a surface of the lift device facing the rotor. Accordingly, advantageously and according to the invention, said part is a part chosen from a turbomachine foil bearing foil and a turbomachine axial thrust bearing foil. The invention therefore extends also to a foil bearing comprising at least one foil according to the invention and/or obtained by a process according to the invention.

A bearing comprising a part according to the invention can be a radial bearing, comprising a rotor formed by a rotating shaft and a stator comprising a support and a lift device in the form of concentric rings. Such a bearing allows the rotating shaft to be guided in rotation by inducing reduced friction. It can comprise one or more foil(s). The foils are, for example, of rectangular shape, their fixing edge fixed to an inside face of the lift device along a generating line thereof, and each foil extending, in the direction of rotation of the rotor, to its free edge.

A bearing comprising a part according to the invention can also be a thrust bearing, the rotor being formed by a rotating cylindrical plate which is fixed coaxially to a shaft around or at the end thereof, the stator comprising a support and a lift device in the form of fixed cylindrical plates, coaxial with one another and with the rotor, which are placed facing the rotor. Such a bearing allows the axial forces produced by the compressor carried by the rotor to be supported. The foils are, for example, substantially trapezoidal in shape, their fixing edge being fixed to a face of the lift device that faces the rotor according to a radius of the lift device, each foil extending, in the direction of rotation of the rotor, to its free edge. The foils are preferably shaped so that they each cover a circular sector of the lift disk and are arranged at regular intervals so as to cover the disk without coverage or with minimum coverage of the sectors themselves.

Advantageously and according to the invention, said coating has a thickness of from 0.2 µm to 5 µm, in particular from 1 µm to 2 µm. The thickness of said coating is measured by methods known to the person skilled in the art, especially measurement by interferometric profilometry or by measurement of induced eddy currents. In particular, it is possible to carry out a topographical analysis of the edge zones of the coating by means of a 3D profilometer.

Advantageously and according to the invention, said at least partially inorganic solid network is chosen from the group formed of networks of metallic oxides, networks of silicon oxides and mixtures thereof. Depending on the nature of the precursor(s) used, the lubricating coating comprises, for example, a silicon dioxide ($SiO_2$) or alternatively an aluminium oxide ($Al_2O_3$).

A part according to the invention can be formed of any material comprising at least one metal. In particular, advantageously and according to the invention, said part is formed of at least one metallic material. A part according to the invention is, for example, formed of a material comprising at least one element chosen from aluminium, nickel, palladium, titanium, zirconium, vanadium, niobium, tantalum, iron, silver, gold, copper, carbon and their alloys. A part according to the invention is advantageously formed of a metal alloy, especially a metal alloy based on nickel, in particular a superalloy such as Inconel®.

The invention extends also to a turbomachine comprising at least one part according to the invention and/or obtained by a process according to the invention. Such a turbomachine can be receiving and/or driving and/or generating; it can be axial and/or centrifugal; and it is in particular a compressor, a turbine or a turbocompressor. In particular, advantageously and according to the invention, such a turbomachine is chosen from compressors for fuel cells.

The invention extends also to an aircraft cabin air conditioning system comprising at least one turbomachine according to the invention. It extends also to an aircraft comprising such an air conditioning system.

The invention extends also to a fuel cell system comprising at least one turbomachine according to the invention.

The invention relates also to a process for manufacturing a part, a part, a turbomachine, an aircraft cabin air conditioning system and a fuel cell system characterized in combination by all or some of the features mentioned hereinabove or hereinbelow.

Figure 2:
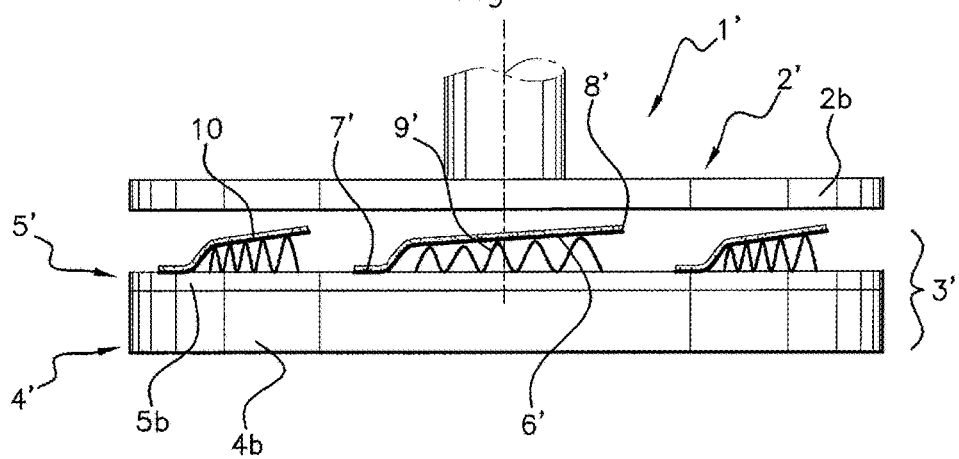
Figure 3:
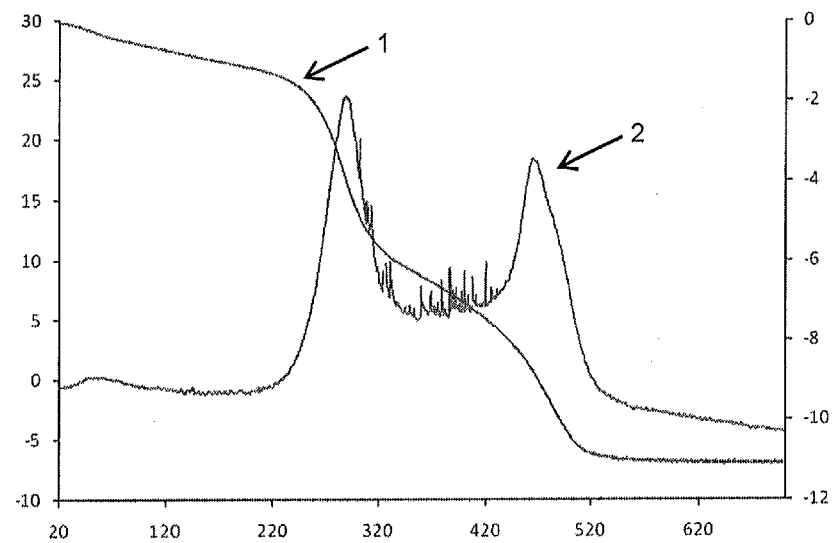
Figure 4:
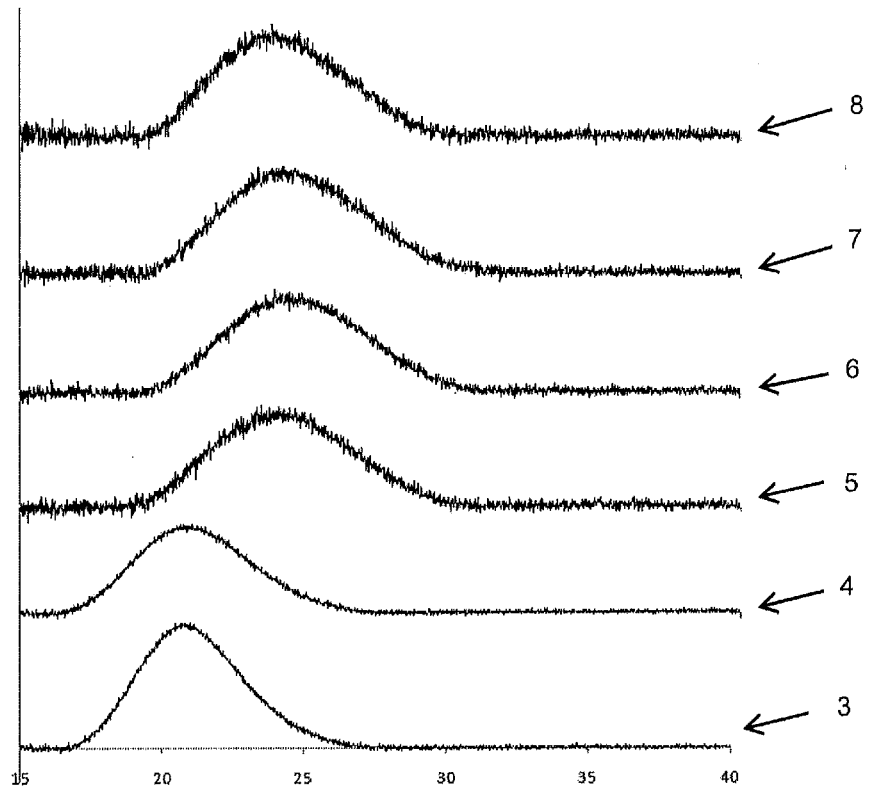
Figure 5:
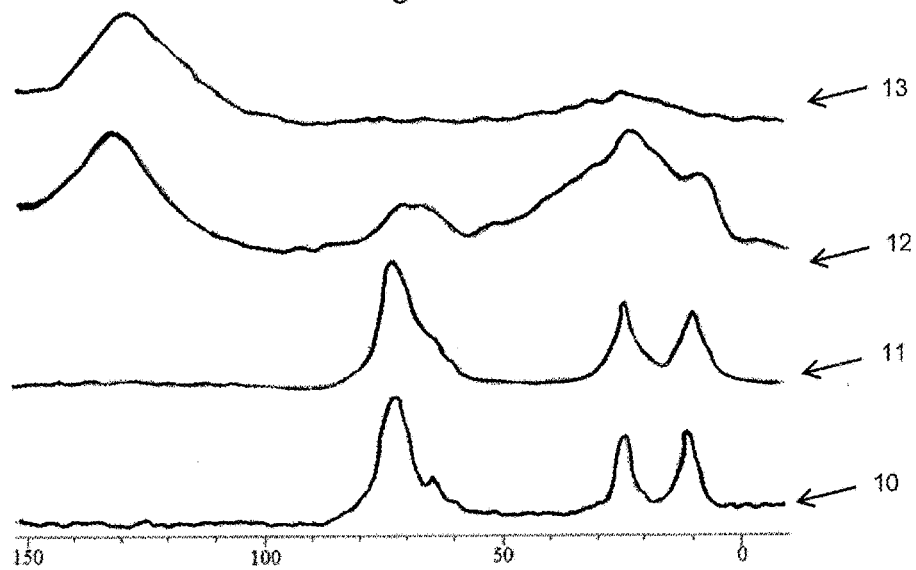
Figure 6:
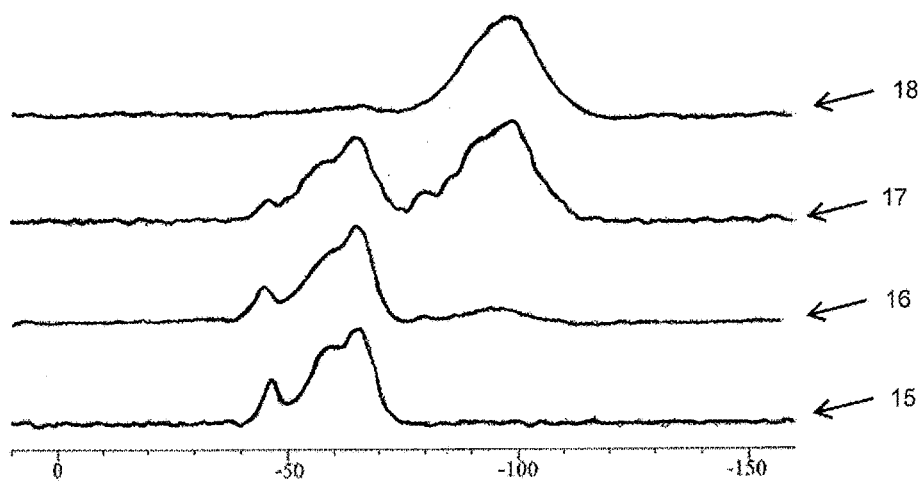
Figure 7:
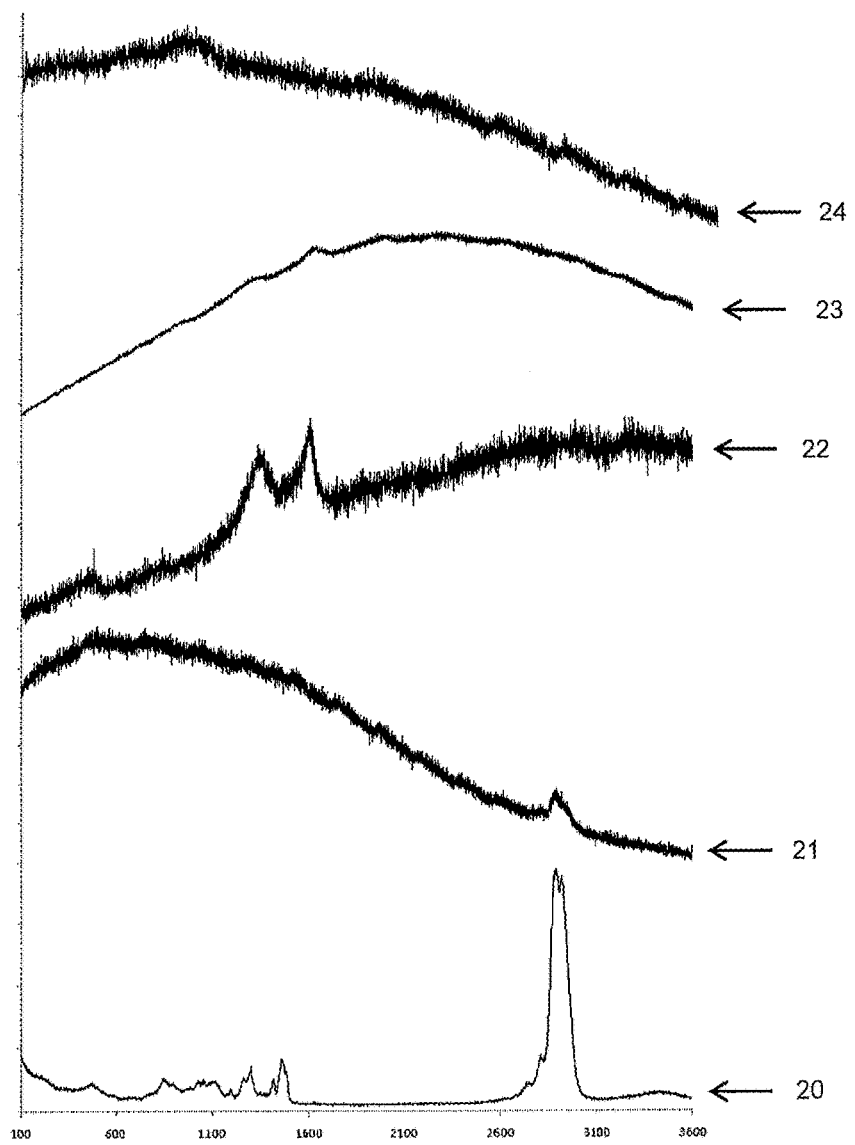
Figure 8:
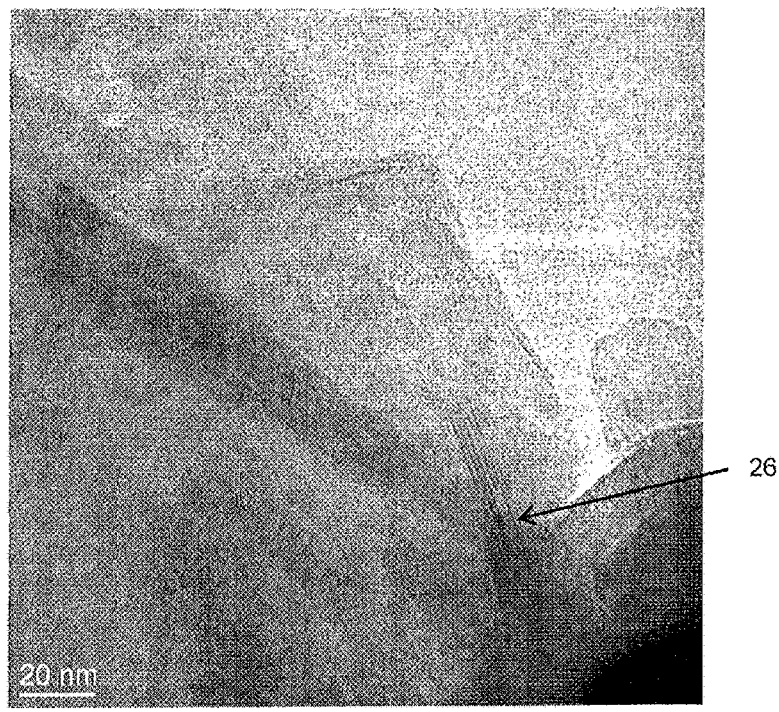
Figure 9:
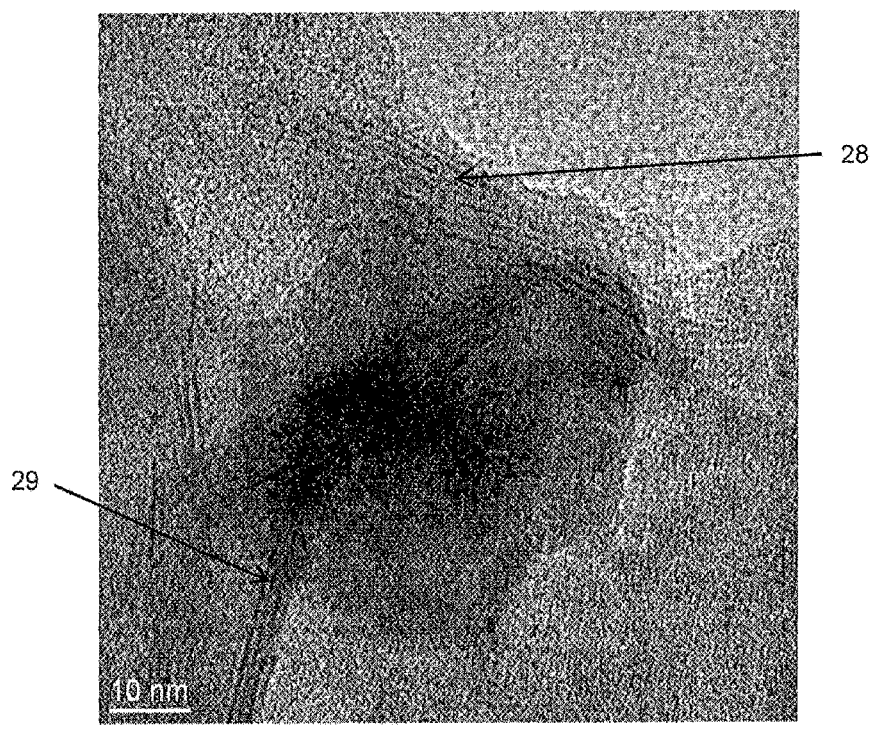

Other objects, features and advantages of the invention will become apparent from reading the following description of a preferred embodiment thereof which is given by way of a non-limiting example and which refers to the accompanying figures, in which:

FIG. 1 shows a transverse section of a foil bearing comprising a plurality of parts according to the invention, FIG. 2 is a side view diagram of an axial thrust bearing comprising a plurality of parts according to the invention, FIG. 3 shows the thermogravimetric analysis (TGA) and differential thermal analysis (DTA) curves of a coating of a part according to the invention, FIG. 4 shows X-ray diffraction diagrams of a coating of parts according to the invention, FIG. 5 shows nuclear magnetic resonance (NMR) spectra of the carbon of a coating of parts according to the invention, FIG. 6 shows NMR spectra of the silicon of a coating of parts according to the invention, FIG. 7 shows Raman infrared spectra of a coating of parts according to the invention, FIG. 8 shows an image obtained by transmission electron microscopy (TEM) of the coating of a part according to the invention, FIG. 9 shows an image obtained by transmission electron microscopy (TEM) of the coating of a part according to the invention.

There is chosen a part made of metal alloy which is to be coated with a lubricating coating, such as a plate which is to form a bearing foil, or an axial thrust bearing foil.

Surface Preparation of the Metal Part:

The surface preparation of the metal alloy aims to provide it with physicochemical properties which are controlled and reproducible whatever its composition, its production conditions (foundry, lamination, . . . ) and the progress of its conversion.

The preparation consists in removing from the surface of the part any trace of natural oxidation or of soiling which may impair the interactions between the metal surface of the part and a precursor composition of the coating; this permits good attachment thereof at the time of deposition of the composition and final adhesion of the coating according to the invention after gelling and extraction of the solvents.

The preparation comprises, for example:

a) degreasing by means of a lipophilic solvent allowing at least some of the grease present on the surface of the part to be dissolved; this operation can be carried out by dipping and/or spraying the surface;

b) alkaline degreasing, which allows degreasing to be completed by dissolving residual grease on the surface of the part; this operation can be carried out by dipping and/or spraying the surface of the part;

c) acid stripping, which permits dissolution of the oxidation layer formed on the surface of the metal alloy during the preceding step of alkaline stripping, or which permits dissolution of the oxides formed naturally on the surface of the metal alloy in the absence of alkaline stripping; this operation can be carried out by dipping and/or spraying;

d) the part is dried in air before the step of depositing the hybrid coating.

Preparation of a Liquid Precursor Composition:

This step consists in preparing a sol by hydrolysis and condensation of a precursor of the alkoxysilane type in a solvent, which can be water, an alcohol or composed of a mixture of the two. In particular, the content of alcoholic solvent is preferably chosen to be minimal in order to reduce the release of volatile organic compounds (VOC). The major precursor is advantageously an alkoxysilane adapted to form a sol-gel coating named "hybrid", that is to say having an organic group which is not modified during the hydrolysis-condensation of the precursor. In particular, the precursor has at least one organic group that is not hydrolyzable, that is to say does not react during the process of sol-gel polymerization by hydrolysis and condensation. There is also used another precursor, such as a metal alkoxide, in which the metal can serve to catalyse the polymerization of the organic functional group of the functionalized alkoxysilane (carrier of said non-hydrolyzable organic group) or to modify the physical and/or chemical characteristics of the sol, of the hybrid coating and of the bonds thereof with the surface of the part after the operation of deposition and heat treatment.

Deposition of the Liquid Precursor Composition:

Several techniques can be used for depositing the hybrid coating according to the invention. Of these techniques, dip coating, spray coating can be used, for example, the choice depending especially on the geometric constraints of the parts to be covered. In the case of localized or repair deposits, these can be carried out by means of a pad or a brush.

In the dip coating technique, the withdrawal speed allows the thickness of the deposits to be controlled for a given sol viscosity. One or more successive operations, separated by drying for removal of the solvent, are possible in order to increase the thickness of the coating.

Advantageously, a device is used which allows the withdrawal rate to be programmed, for example, between 50 and 530 mm/minute and which can be equipped with a device for rotating, inclining, centrifuging the part. It is also possible to impose a prolonged residence time of the part in the liquid composition in order, for example, to promote the chemical reactions between the immersed alloy and the sol. The immersion times can vary, for example, between 1 second and 300 seconds.

In the spray coating technique, the thickness of the deposits is controlled, as in the case of a paint deposit, by the viscosity of the sol, the spraying parameters (pressure, flow rate, nozzle characteristics, displacement speed) and by the number of passages carried out. Application can be carried out manually or automatically, according to conventional techniques.

In the techniques of deposition by means of a pad or brush, the thickness deposited is controlled by the viscosity of the sol and the number of passes.

In order to optimize the process by limiting too rapid evaporation of the solvents or avoiding any risk of external pollution, the deposition steps can be carried out in a vessel with controlled atmosphere and humidity. In this case, the parts are, for example, maintained for 30 seconds after immersion before being placed in the vessel for the heat treatment.

During the deposition, the sol deposited, still in the liquid state, on the surface of the part is rapidly converted by hydrolysis-condensation into a solid xerogel which still contains solvent. According to the pH conditions, for example, hydrolysis-condensation reactions can also take place starting from the hydroxylated groups present on the surface of the substrate.

Furthermore, the deposition step of a process according to the invention is substantially less restrictive, in terms of cost and safety, than a deposition step of a process of the prior art using a liquid composition based on polytetrafluoroethylene. A composition based on polytetrafluoroethylene is generally deposited by means of a gun under a considerable air flow in order to allow the toxic gases obtained from the composition to be removed, which requires special installations and additional energy consumption.

Heat Treatment

The heat treatment aims to remove the solvents that are still present within the xerogel after the deposition step and to assist with the complete polymerisation of the xerogel to form a hybrid solid lubricating coating. In some cases, the heat treatment can be carried out in a plurality of steps. For example, the heat treatment can comprise a first stage allowing the aqueous and organic solvents to be removed, and a second stage, at a higher temperature, which allows said coating to be provided with its lubricating properties.

After a first step of heat treatment at low temperature in air (for example at 110° C.), the sol-gel deposit is of the organic-inorganic hybrid type, its two parts being chemically bonded. This deposit covers the totality of the surface of the substrate and no crack or defect can be observed. On the other hand, it does not have lubricating properties.

A second, subsequent step with an increase of the heat treatment temperature modifies the properties of the deposit to form a lubricating coating according to the invention. After heat treatment at 250° C. in air (oxidizing atmosphere), the non-hydrolyzable organic groups of the alkoxide(s) are thermally decomposed and recombine as amorphous carbon and/or graphite and/or graphene. There is thus obtained a part having on the surface a lubricating coating formed of a matrix of silica and alumina incorporating natural amorphous carbon and/or graphite and/or graphene, which adheres perfectly to the surface of the part.

Densification of the coating, accompanied by an increase in the modulus of elasticity, to which there is added the difference in thermal expansion coefficient between the metal part and the lubricating coating, leads to the formation of a network of cracks. The propagation of the cracks and their orientation (random or oriented) depend on the thickness of the coating and the roughness of the surface of the underlying part (amplitude, morphology and orientation). The formation of such a network of cracks is not only not detrimental to the mechanical properties of the lubricating coating and the adhesion thereof to the part; it also renders the lubricating coating tolerant to shaping of the metal part without any risk of delamination. Accordingly, in a variant embodiment, the coating has cracks whose width is from 0.1 µm to 12 µm, especially from 0.2 µm to 3 µm.

Each heat treatment step is carried out at a temperature below the temperature of decomposition by total oxidation of each organic group of the precursor to gaseous products ($CO_2$, ...).

In a first variant embodiment, the heat treatment is carried out in air at a temperature of from 220° C. to 450° C., in particular from 250° C. to 400° C. If the heat treatment is carried out in air at a temperature above 450° C., the amorphous carbon is oxidized and is then freed in gaseous form, leaving only the cracked silica-alumina matrix, which no longer has the lubricating properties of a coating according to the invention but retains its wear resistance properties (high hardness and elastic modulus).

In order to ensure controlled conversion of the organic phase into natural amorphous carbon and/or graphite and/or graphene, the heat treatment can be carried out according to another variant under a neutral or reducing atmosphere. The oxidation of some of the carbon of the organic groups of the precursors to gas ($CO_2$) and the residual quantity of carbon dispersed in the solid network of the silica-alumina matrix can thus be controlled.

In a reducing atmosphere, the reactions of thermal decomposition and formation of amorphous carbon take place at a higher temperature (>300° C.). An improvement in the lubricating properties is obtained by carrying out the heat treatment under a reducing atmosphere (nitrogen) at a temperature of from 300° C. to 800° C., in particular from 350° C. to 550° C. Under a reducing atmosphere, the natural amorphous carbon and/or graphite and/or graphene in the solid network form up to temperatures of 800° C., especially up to 550° C., under nitrogen.

A lubricating coating so formed is further compatible with high linear speeds of dynamic friction of the parts in contact, which can reach 2000 m/s, and with use at a high temperature, which can reach 500° C.

FIGS. 1 and 2 are not to scale, for illustration purposes. In particular, the thickness of the surface coating 10 is exaggeratedly large.

The bearing 1 shown in FIG. 1 in the form of a foil bearing comprises a rotor 2 in the form of a cylindrical shaft and a stator 3 comprising a support 4 in the form of an outer sleeve 4a and a lift device 5 in the form of a ring 5a which is coaxial with the sleeve 4a and mounted inside the sleeve. The outside diameter of the ring 5a of the lift device 5 is adjusted to the inside diameter of the sleeve 4a. Tightening of the fit and/or fixing means (not shown) keep the sleeve 4a and the ring 5a stationary relative to one another in a predetermined position.

The lift device 5 also comprises a plurality of foils 6 which are flexurally resilient, are of generally rectangular shape and are distributed evenly inside the ring 5a. Each foil 6 is fixed to the inside surface of the ring 5a by an edge, named the fixing edge 7, which extends parallel to the axis of the ring along a generating line of that surface. The fixing edge 7 is attached to the ring 5a of the lift device by means known per se, such as welding, riveting, setting in a slot, etc.

Each foil 6 is a part according to the invention, has been treated by a process according to the invention and thus has a lubricating surface coating 10 formed of an at least partially inorganic solid network incorporating, in the natural state within the network, at least one solid lubricating carbon compound chosen from the group formed of graphene, graphite, amorphous carbon and mixtures thereof The opposite edge, named the free edge 8, of the foil 6 extends towards the rear, in the direction of rotation and, radially, in the direction of the rotor 2 in order to create an "air wedge" allowing the rotor to be lifted on a film of gas. Preferably, the free edge 8 of each foil 6 extends at least substantially to above (when viewed radially) the fixing edge 7 of the following foil so that the sum of the angular sectors covered by the foils 6 is approximately equal to 360 degrees in order to cover to the best possible extent the inside circumference of the bearing.

In order to permit support and approximate centring of the shaft when it is not rotating, and in order to limit the deflection of the foils 6, for example in the event of variations in the radial load during operation, each foil 6 is advantageously held by a stiffener 9 formed by an undulating, preferably metallic strip, in which the axis of the undulations is substantially parallel to the fixing edge 7 of the foil 6. The stiffener 9 is fixed beneath the foil 6, on the inside face of the ring 5a, at least by the front edge, on the side of the fixing edge 7, of its first undulation in order to permit resilient deformation of the stiffener 9.

At rest, when the rotor 2 is stationary, the foils 6 are in contact at least in part with the rotor. At low speeds of rotation of the rotor (start-up and stopping phases), the lubricating coatings 10 of the foils 6 rub (dry friction) against the rotor 2.

During operation, the shaft 2a rotates relative to the stator 3 and therefore relative to the foils 6. The film of air drawn in by the rotation of the shaft is compressed in the space between the foil and the shaft (named the convergent gap) and forms a pressure field which allows the shaft to be lifted at a distance of several microns from the foils 6.

In a variant embodiment according to the invention, the shaft 2a has, for example, a diameter of from 25 mm to 50 mm, and each foil 6 has two main faces whose sides are from 25 mm to 50 mm, the thickness of each foil being approximately 0.1 mm.

FIG. 2 shows an axial thrust bearing. The thrust bearing 1' also has a rotor 2' comprising a cylindrical plate 2b which is integral with a rotating shaft. The thrust bearing 1' also comprises a stator 3' comprising a support 4' in the form of a support disk 4b and a lift device 5' comprising a disk 5b. The cylindrical plate 2b, the support disk 4b and the lift device disk 5b are coaxial and have as their common axis the axis of rotation of the thrust bearing. The lift device disk 5b is fixed to the support disk 4b in a predetermined angular position by means of screws (not shown) through fixing holes formed in the lift device disk and the support disk.

The lift device disk 5b also comprises, on its face facing the plate 2b of the rotor, a plurality of resilient foils 6', of substantially trapezoidal shape, which are evenly distributed on the lift device disk so that they each cover an angular sector centred on the axis of rotation of the thrust bearing. The foils 6' are fixed to the disk 5b by a fixing edge 7' in a radial direction, orthogonal to the direction of rotation of the thrust bearing, and extend towards the rear, in the direction of rotation, to a free edge 8' substantially parallel to the radial direction.

Each foil 6' is a part according to the invention, has been treated by a process according to the invention and thus has a lubricating surface coating 10' formed by an at least partially inorganic solid network incorporating, in the natural state within the network, at least one solid lubricating carbon compound chosen from the group formed of graphene, graphite, amorphous carbon and mixtures thereof In the axial direction, the foils 6' comprise an abrupt slope which extends from the fixing edge 7' towards the rotor 2' and is followed by a gently sloping portion rising towards the rotor, or even substantially parallel thereto. Each foil 6' thus defines between its fixing edge 7' and its free edge 8' a convergent gap in which the air film which exists between the foil 6' and the plate 2b' of the rotor is compressed.

The foils 6' are individually in abutment by their face facing the lift device disk 5b' on a stiffener 9' formed analogously to the stiffener of FIG. 1 by an undulating, preferably metal band having a width corresponding to that of the foil 6'. The axis of the undulations of the stiffener 9' is substantially parallel to the fixing edge 7' of the foil 6'. The stiffener 9' is also fixed to the lift device disk 5b, beneath the resilient foil 6', at least by the front edge of its first undulation so as to permit resilient deformation of the stiffener in the axial direction.

At rest, when the rotor 2' is stationary, the cylindrical plate 2b rests on the foils 6', which are themselves held by the stiffeners 9'. At low speeds of rotation of the rotor (start-up and stopping phases), the plate 2b rubs (dry dynamic friction) against the lubricating coatings 10' of the foils 6'.

During operation, the cylindrical plate 2b rotates relative to the stator 3' and therefore relative to the foils 6'. The film of air drawn in by the rotation of the plate 2b is compressed in each convergent gap between each foil 6' and the plate 2b and forms a pressure field which allows the plate 2b to be maintained at a distance of several microns from the foil 6'.

It has been found that the presence of said lubricating coating according to the invention allows the friction forces to be reduced and therefore allows the axial loading capacity of the thrust bearing 1' to be increased.

EXAMPLE

A plurality of foil bearing foils formed of a superalloy based on nickel and chromium (of the Inconel 750® type) are manufactured. The surface of each foil is degreased with pure acetone at a temperature below 42° C. for from 5 seconds to 3 minutes. Alkaline degreasing is then carried out by means of an alkaline solution comprising from 40 to 60 g/l of Borax and from 40 to 60 g/l of sodium tripolyphosphate at 50° C.-70° C. for from 10 minutes to 30 minutes. Each foil is then dried in air.

There is prepared, with stirring, a precursor composition (sol) comprising 1.79 mol/l of glycidoxypropyltrimethoxysilane (GPTMS) and 0.77 mol/l of aluminium tris(s-butoxide), the molar ratio of GPTMS to aluminium tri(s-butoxide) in the composition being 70/30. The precursor composition further comprises 21 mol/l of water and 0.45 mol/l of propan-1-ol.

The composition so prepared is stored (maturation of the sol) for 24 hours at 25° C.

The foils previously prepared are then dipped in the sol and withdrawn at a withdrawal rate of 75 mm/minute.

The foils so coated with the sol are then placed in an oven at 50° C. for 24 hours and then heat treatment of the foils is carried out at 110° C. (foil 1), 200° C. (foil 2), 250° C. (foil 2'), 300° C. (foil 3), 400° C. (foil 4) or 500° C. (foil 5) for 16 hours in air.

The foils so coated are shaped by being bent according to a curvature of from 30 $m^{-1}$ to 80 $m^{-1}$.

In FIG. 3, curve 1 shows the thermogravimetric analysis (TGA) curve and curve 2 shows the differential thermal analysis (DTA) curve of the coating deposited on a bearing foil so prepared, before heat treatment. The temperature is shown on the abscissa. The loss of mass measured by TGA is shown on the ordinate to the right of the curves. These analyses show exothermic decomposition accompanied by a loss of mass of 5% between 220° C. and 350° C. This loss of mass corresponds to a gaseous release of by-products of the decomposition reaction of the glycidoxypropyl group at least in part to particles of amorphous carbon and of graphene. These gaseous by-products are especially water, carbon dioxide, methane or ethylene.

FIG. 4 shows an X-ray diffraction diagram of the coating deposited on the bearing foils so prepared for different heat treatment temperatures. Curve 3 corresponds to foil 1 (heat treatment at 110° C.), curve 4 corresponds to foil 2 (heat treatment at 200° C.), curve 5 corresponds to foil 2' (heat treatment at 250° C.), curve 6 corresponds to foil 3 (heat treatment at 300° C.), curve 7 corresponds to foil 4 (heat treatment at 400° C.), and curve 8 corresponds to foil 5 (heat treatment at 500° C.). It is thus observed that a phase change (probably corresponding to the conversion of the glycidoxypropyl group at least in part into particles of amorphous carbon and of graphene) takes place between 200° C. and 250° C.

FIG. 5 shows the nuclear magnetic resonance (NMR) spectra of the carbon of the coating deposited on a bearing foil so prepared for different heat treatment temperatures. Curve 10 corresponds to foil 1 (heat treatment at 110° C.), curve 11 corresponds to foil 2 (heat treatment at 200° C.), curve 12 corresponds to foil 2' (heat treatment at 250° C.) and curve 13 corresponds to foil 3 (heat treatment at 300° C.). On curves 10 and 12, the peaks situated between 10 ppm and 35 ppm as well as the peaks situated between 60 ppm and 75 ppm are characteristic of the glycidoxypropyl group. On curves 12 and 13 there appears a peak characteristic of graphene (chemical shifts between −120 ppm and −150 ppm, characteristic of type $sp^2$ C—C bonds). These spectra therefore show the formation within the coating, at 250° C. and above, of amorphous carbon and graphene.

FIG. 6 shows NMR spectra of the silicon of the coating deposited on the bearing foil so prepared for different heat treatment temperatures. Curve 15 corresponds to foil 1 (heat treatment at 110° C.), curve 16 corresponds to foil 2 (heat treatment at 200° C.), curve 17 corresponds to foil 2' (heat treatment at 250° C.) and curve 18 corresponds to foil 3 (heat treatment at 300° C.). These spectra show the formation within the coating, at 250° C. and above, of silica (chemical shifts between −80 ppm and −110 ppm) simultaneously with the appearance of amorphous carbon and graphene.

FIG. 7 shows the Raman infrared spectra of the coating deposited on a bearing foil so prepared for different heat treatment temperatures. Curve 20 corresponds to foil 1 (heat treatment at 110° C.), curve 21 corresponds to foil 2 (heat treatment at 200° C.), curve 22 corresponds to foil 2' (heat treatment at 250° C.), curve 23 corresponds to foil 3 (heat treatment at 300° C.) and curve 24 corresponds to foil 4 (heat treatment at 400° C.). These spectra therefore show the formation of amorphous carbon and graphene within the coating at 250° C. and above.

Tribological tests were also carried out on foil 1 (heat treatment at 110° C.), foil 2' (heat treatment at 250° C.) and foil 5 (heat treatment at 500° C.). Each tribological test consists in subjecting the coated surface of each foil to the friction of an alumina bead having a diameter of 6 mm. For each cycle, the bead executes a straight 12 mm outward and return travel (that is to say 6 mm outward and 6 mm return) at a speed of 3.77 cm/s with application of a force of 1 N on the foil. It is observed that the coefficient of friction is approximately 0.4 for foil 2' and remains constant up to 1000 cycles. By comparison, it is observed that the coefficient of friction is approximately 0.6 for foil 1 up to about 420 cycles and increases to reach a value of approximately 0.85 between 500 and 1000 cycles. For foil 5, the coefficient of friction increases slightly between 0.5 and 0.6 during the first 200 cycles and remains at approximately 0.6 up to 1000 cycles. The coefficient of friction of a foil without a lubricating coating is from 0.7 to 0.9 under the same test conditions. A process for manufacturing a part such as the foil 2' according to the invention therefore allows the friction resistance of said part to be increased considerably, foil 2' having better lubricating properties than foil 1.

Foil 2' was also characterized by high resolution transmission electron microscopy (TEM). FIGS. 8 and 9 show images obtained by observing foil 2' by transmission electron microscopy (TEM). On each of FIGS. 8 and 9 there is observed, in the matrix of the coating formed of silica and alumina, the presence of graphene layers 26, 28 and 29

(visible on their slice in the form of black lines substantially parallel to one another). The inventors have observed that the particles of graphene are dispersed homogeneously throughout the coating and are not agglomerated. Each particle of graphene is formed of a stack of from 4 to 8 layers of graphene. The largest dimension of the particles of graphene is approximately from 10 to 50 nm.

By means of elemental microanalysis by analysis of the total organic carbon by means of a TOC 5050A® device marketed by SHIMADZU (Marne La Vallée, France), it has also been determined that the coating of foil 2' comprises 20 wt. % solid lubricating carbon (graphene and amorphous carbon), based on the total weight of the coating.

The coating so formed has a thickness of approximately 1 μm (thickness measured by interferometric profilometry).

The invention can be the subject of a very large number of variant embodiments. In particular, a part according to the invention can be any part of a rotating machine, especially of a turbomachine having a high speed of rotation (for example of air conditioning systems, fuel cells for aircraft, land or water vehicles).

The invention claimed is:

1. A process for manufacturing a part provided with a lubricating surface coating, said part being chosen from a turbomachine foil bearing foil and a turbomachine axial thrust bearing foil wherein:
    a composition comprising at least one precursor of said lubricating surface coating having at least one organic group is prepared,
    said composition is deposited on at least a portion of a surface of said part, said portion of a surface of the part being formed of at least one metallic material,
    after said composition has been deposited on the surface of said part, at least one heat treatment is carried out at a temperature greater than 220° C. so as to form a lubricating surface coating,
    wherein said composition comprises at least one precursor of said lubricating surface coating chosen from the group formed of the alkoxides of the following general formula (I):

$$X(O-R_1)_{n'-a}(R_2)_a \qquad (I)$$

wherein:
    X is chosen from silicon (Si) and the metallic elements,
    $R_1$ is chosen from the hydrocarbyl groups,
    n' is a natural integer representing the valence of the element X,
    a is a natural integer of the interval [1; n'],
    $R_2$ is chosen from the organic groups bonded to X by a carbon atom,
so as to form, at the end of said heat treatment, a lubricating surface coating formed of an inorganic solid network incorporating solid carbon in at least one lubricating allotropic form in a dispersed state and trapped within said solid network, said solid carbon lubricating allotropic form being at least graphene, said lubricating surface coating being free of organic groups and polymeric material and composed solely of a solid ceramic network incorporating said solid carbon, and said lubricating surface coating having a thickness of from 0.2 μm to 5 μm.

2. The process as claimed in claim 1, wherein at least one organic group of at least one precursor of said lubricating surface coating is chosen from the hydrocarbyl groups, and wherein the heat treatment is carried out so as to form within said solid network at least one solid lubricating compound of carbon chosen from the group formed of graphene, graphite, amorphous carbon and mixtures thereof.

3. The process as claimed in claim 1, wherein said composition comprises at least one precursor chosen from the group formed of the alkoxysilanes of the following general formula (II):

$$Si(O-R_1)_{4-a}(R_2)_a \qquad (II)$$

wherein:
    $R_1$ is chosen from the hydrocarbyl groups,
    a is a natural integer of the interval [1; 3],
    $R_2$ is chosen from the organic groups bonded to silicon by a carbon atom.

4. The process as claimed in claim 1, wherein said composition comprises at least one precursor chosen from the group formed of the metal alkoxides of the following general formula (III):

$$M(O-R_3)_m \qquad (III)$$

wherein:
    M is a metallic element chosen from aluminium, titanium, zirconium and vanadium,
    $R_3$ is a hydrocarbyl group of the formula $[C_nH_{2n+1}]$, n being an integer greater than or equal to 1,
    m is a natural integer representing the valence of the metallic element M.

5. The process as claimed in claim 1, wherein said heat treatment is carried out in an oxidizing atmosphere at a temperature of from 220° C. to 450° C.

6. The process as claimed in claim 1, wherein said heat treatment is carried out in a non-oxidizing atmosphere at a temperature of from 300° C. to 800° C.

7. The process as claimed in claim 1, wherein said composition is deposited on at least a portion of a surface of said part by a deposition technique chosen from dip coating, spray coating, centrifugation and screen printing.

8. The process as claimed in claim 1, wherein, after said heat treatment, the part is deformed by bending.

9. A part provided with a lubricating surface coating, wherein said lubricating surface coating is formed of an inorganic solid network incorporating solid carbon in at least one lubricating allotropic form in a dispersed state and trapped within said solid network, said solid carbon being graphene, said lubricating surface coating being free of organic groups and polymeric material and composed solely of a solid ceramic network incorporating said solid carbon,
    said part being formed of at least one metallic material and being chosen from a turbomachine foil bearing foil and a turbomachine axial thrust bearing foil and said lubricating surface coating having a thickness of from 0.2 μm to 5 μm, and
    said coating being formed by at least one heat treatment carried out at a temperature greater than 220° C., after deposition of a composition comprising at least one precursor of said lubricating surface coating chosen from the group formed of the alkoxides of the following general formula (I):

$$X(O-R_1)_{n'-a}(R_2)_a \qquad (I)$$

wherein:
    X is chosen from silicon (Si) and the metallic elements,
    $R_1$ is chosen from the hydrocarbyl groups,
    n' is a natural integer representing the valence of the element X,
    a is a natural integer of the interval [1; n'],
    $R_2$ is chosen from the organic groups bonded to X by a carbon atom.

10. The part as claimed in claim 9, wherein said inorganic solid network is chosen from the group formed of metallic oxide networks, silicon oxide networks and mixtures thereof.

11. A turbomachine, especially a compressor, a turbine or a turbocompressor, comprising at least one part according to claim 9.

12. An aircraft cabin air conditioning system comprising at least one turbomachine as claimed in claim 11.

13. A fuel cell system comprising at least one turbomachine as claimed in claim 11.

14. The process as claimed in claim 2, wherein said composition comprises at least one precursor chosen from the group formed of the alkoxysilanes of the following general formula (II):

$$Si(O-R_1)_{4-a}(R_2)_a \quad (II)$$

wherein:
- $R_1$ is chosen from the hydrocarbyl groups,
- a is a natural integer of the interval [1 ; 3],
- $R_2$ is chosen from the organic groups bonded to silicon by a carbon atom.

* * * * *